United States Patent [19]

Wiegand

[11] Patent Number: 4,743,905
[45] Date of Patent: May 10, 1988

[54] ELECTRONIC COUNTER MEASURE SYSTEM UTILIZING A DIGITAL RF MEMORY

[75] Inventor: Richard J. Wiegand, Severna Park, Md.

[73] Assignee: Westinghouse Electric Corp., Pittsburgh, Pa.

[21] Appl. No.: 766,305

[22] Filed: Aug. 16, 1985

[51] Int. Cl.[4] ............................................. G01S 7/38
[52] U.S. Cl. ....................................... 342/14; 342/15
[58] Field of Search ............... 342/13, 14, 15; 365/45, 365/191, 192, 197; 381/32; 369/59, 60; 333/165

[56] References Cited

U.S. PATENT DOCUMENTS

| | | | |
|---|---|---|---|
| 3,720,952 | 3/1973 | Lawsine | 342/15 |
| 3,827,027 | 7/1979 | Towson et al. | 342/176 X |
| 3,947,827 | 3/1976 | Dautremont, Jr. et al. | 365/45 |
| 3,991,409 | 11/1976 | Dautremont, Jr. et al. | 365/45 X |
| 4,017,856 | 4/1977 | Wiegand | 342/15 |
| 4,025,920 | 5/1977 | Reitboeck et al. | 342/13 |
| 4,145,691 | 3/1977 | Freeling et al. | 342/15 |
| 4,217,580 | 8/1980 | Lowenschuss | 342/13 |

OTHER PUBLICATIONS

Frank J. Calandra, "EW Systems Applies Deceptive Countermeasures", Jan. 1979, Microwaves, vol. 18, No. 1, p. 91.

Primary Examiner—T. H. Tubbesing
Assistant Examiner—Gilberto Barrón, Jr.
Attorney, Agent, or Firm—W. G. Sutcliff

[57] ABSTRACT

An active radar jamming system using a digital radio frequency memory (DRFM) as the central subsystem in the generation and detection of specific signal characteristics. Associated systems control the operation, data processing, and loading of the DRFM. Signals generated by the jamming system are either repeated replicas of the received radar signal stored in the DRFM, or newly generated signals constructed from data loaded into the DRFM by the associated subsystems. Such associated subsystems generate appropriate data for providing carrier and noise RF signals. Systems are also provided for determining the presence of phase coding and chirp modulation in the received radar signal data contained in the DRFM, and for detecting the angle-of-arrival of the radar signal.

3 Claims, 4 Drawing Sheets

ELECTRONIC COUNTER MEASURE SYSTEM UTILIZING A DIGITAL RF MEMORY

BACKGROUND OF THE INVENTION

This invention relates, in general, to electronic warfare systems and, more specifically, to active radar jamming systems.

Active radar jammers are used in the field of electronic countermeasures to confuse or counter the system originating the radar signals. In some situations, it is desirable to return signals to the radar system which are exact copies of the arriving radar signal. In other situations, it is desirable to return signals to the radar system which have characteristics other than that of the received radar signal. Frequently, this type of returned signal is in the form of RF noise for the purpose of jamming the radar system. In addition to the type of the RF signal desired to be transmitted by the jamming system, the angle-of-arrival of the radar signal and the steering of the antenna beam when transmitting from the jamming system are also important considerations. In addition, the type of signal received by the jamming system is of concern, such as whether the radar signal received by the jamming system contains phase coding or chirp modulation.

In order to achieve these capabilities and functions according to the prior art, many separate subsystems and discrete elements were necessary to perform many of the functions of the jamming system, such as signal reception, transponder or repeater operation, noise generation, angle of arrival determination, and transmit antenna steering. The use of separate subsystems presents a cost and reliability consideration in the manufacture and operation of such devices. In addition, such separate subsystems are usually dedicated to a particular function, and modifying or programming these subsystems for different functions is not easily accomplished.

It is desirable to use a digital radio frequency memory (DRFM) for the purpose of obtaining and storing the data from the radar signal. U.S. Pat. Nos. 3,947,827 and 3,991,409 teach the use of an DRFM in electronic countermeasure systems. While these patents disclose or mention the use of an DRFM in connection with electronic countermeasure systems, they do not teach the use of an DRFM for the purposes disclosed and claimed by the present invention.

It is desirable, and it is an object of this invention, to provide a radar jamming system wherein the requirement for separate subsystems as taught by the prior art are mostly eliminated, and wherein the capabilities of the jamming device to detect and originate suitable signals are enhanced by the ability to better adapt to the prevailing conditions and requirements.

SUMMARY OF THE INVENTION

There is disclosed herein a new and useful electronic countermeasure active radar jamming system which uses a digital radio frequency memory (DRFM). Radar signals received by the jamming system are stored, under supervisory control, in the DRFM. When the type of jamming desired includes repeating or replicating the received signal, the digital data from the memory is used to construct the RF signal used to jam or confuse the radar. When jamming with a signal of different characteristics is desired, the DRFM is loaded with data calculated to produce the desired signal characteristics. All signal generation, modulation, frequency and phase control, and timing constraints of the resulting output signal are determined by the data in the DRFM rather than by separate subsystems as taught by the prior art.

In order to produce an RF signal with different characteristics than that of the received radar signal, data is generated for loading into the DRFM. According to this invention, this data is generated by a system which specifies that the frequency and phase of the desired signal is constant with respect to time, converts the desired frequency to an intermediate frequency, digitizes the analog frequency waveform by a one-bit process, and loads the data into the DRFM. When the type of jamming desired requires that a noise signal be provided, a similar system is employed which changes the specified frequency and/or phase with respect to time and proceeds thereafter the same as if generating a pure carrier RF signal.

The jamming system of this invention also includes a phase coding and chirp detector which can be used to detect frequency modulation of the received radar signal and appropriately notify any system circuits which need this information. Frequency modulation detection is accomplished by down loading the captured DRFM data and transforming these time domain digital samples into the frequency domain, identifying the frequency having the largest amplitude, and determining if the identified frequency has a normalized spectral width greater than a predetermined amount. Thus, signals having a spectral width greater than the predetermined amount are deemed to be from radar signals employing chirp or phase coded modulation.

As a further feature of this invention, the DRFM is used in conjunction with the jamming system to determine the angle-of-arrival of the radar signal and to steer the beam of the signal transmitted from the jamming system. To detect the angle-of-arrival, a phased-array antenna system is used with each effective antenna element connected to a different DRFM, or to a multi-section DRFM. The angle-of-arrival system transforms the time domain signal data from the DRFM sections into frequency domain data, calculates the differences in the phase of the signals in each DRFM, and averages the phase differences over all of the common sections.

BRIEF DESCRIPTION OF THE DRAWINGS

Further advantages and uses of this invention will become more apparent when considered in view of the following detailed description and drawings, in which.

DESCRIPTION OF THE PREFERRED EMBODIMENTS

Figure 1:
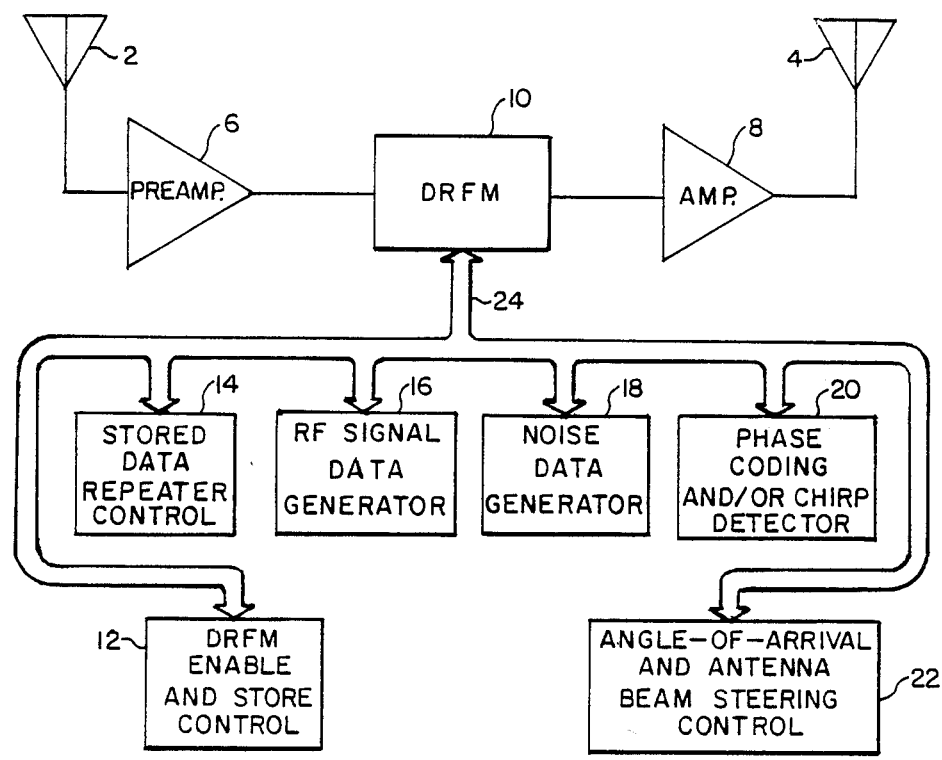
FIG. 1 is a block diagram of a radar jammer constructed according to this invention.

Throughout the following description, similar reference characters refer to similar elements or functions in all of the Figures of the drawings. Referring now to the drawings, and to FIG. 1 in particular, there is shown a block diagram of a radar jamming system constructed according to a specific embodiment of this invention. Receiving antenna 2 captures or picks-up the microwave RF signals from the radar system which is to be jammed. These signals pass through the preamplifier 6 to a digital radio frequency memory (DRFM) 10. Signals leaving the DRFM 10 are amplified by the power amplifier 8 and are sent back toward the radar system by the transmitting antenna 4. The DRFM 10, which will be described in more detail in connection with FIG. 2, generally stores data corresponding to the received RF radar signal and/or corresponding to specific signal patterns developed by other system units and transferred to the DRFM over the data and control bus 24. The data in the DRFM 10 is used to generate the RF signal which is applied to the transmitting antenna 4 for the purpose of confusing or jamming the radar system.

Block 12 illustrates the apparatus used to enable the DRFM for the purpose of storing therein data corresponding to the received radar signals. For some types of jamming, an exact replica of the received signal is to be transmitted back to the radar system. In such cases, the stored data repeater control of block 14 activates the DRFM 10 and causes it to use the data previously loaded from the radar signal. For other types of jamming, separate or different signals are desirable. In such cases, a new RF signal, modulated or unmodulated, must be generated. The RF signal data generator 16 provides, in such cases, digital data to the DRFM 10 which ultimately governs the output of the DRFM 10. In still other jamming situations, it is desirable to transmit RF noise back to the radar system. The noise data generator 18, shown in FIG. 1, generates and provides data to the DRFM 10 over the data and control bus 24 for the purpose of allowing the DRFM 10 to provide RF noise signals at its output.

Aside from the capabilities of the DRFM 10 to reproduce, repeat or generate new RF signals, data acquired by the DRFM 10 can be used by the jamming system to help determine characteristics of the desired jamming signal. The phase coding and chirp detector 20, shown in FIG. 1, examines and processes the data received by the DRFM 10 and determines whether that data originated from a radar signal which was phase coded or chirp modulated. Also of concern with radar jamming systems is the angle-of-arrival of the radar signal. According to block 22, the angle-of-arrival of the radar signal is determined, in part, by processing the data from the DRFM 10. In addition, by properly controlling the phase of the data loaded into the DRFM 10, a phased-array antenna system can be controlled to point the transmitted signal to the radar system. Both the angle-of-arrival measurement and the beam steering control features of this device require more than one DRFM or a multiple section DRFM and appropriate receiving and transmitting antennas, such as phased-array antennas.

Figure 2:
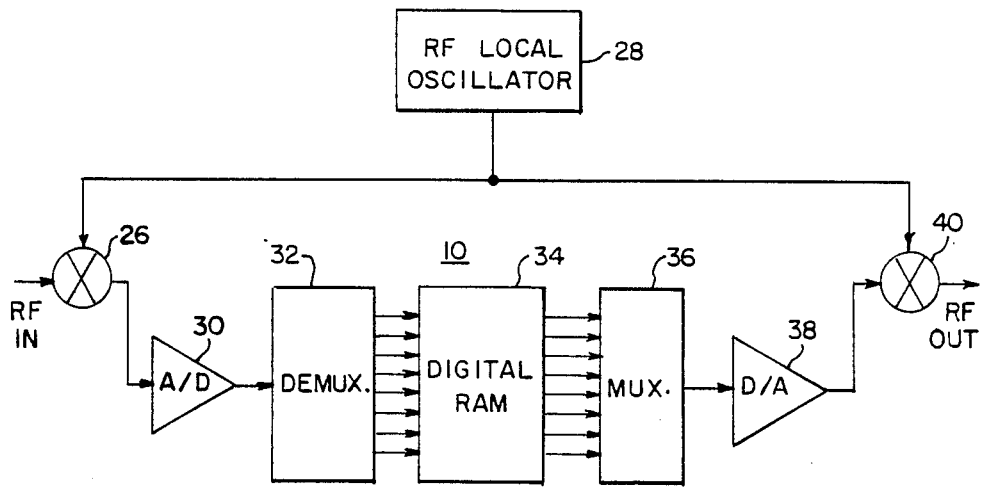
FIG. 2 is a block diagram of a DRFM used by the jamming device of this invention.

FIG. 2 is a block diagram of a digital radio frequency memory (also sometimes referred to as radio frequency digital memory RFDM). In this specific embodiment, the circuit shown in FIG. 2 is equivalent to the DRFM 10 shown in FIG. 1. The incoming RF signal is applied to a mixer 26 to which is also applied an RF local oscillator signal from the local oscillator 28. The converted IF signal is applied to the analog-to-digital converter 30. Because of the mixing action of the mixer 26, the signal applied to the A/D converter 30 is much lower in frequency than the original RF frequency applied to the mixer 26. Signals from the A/D converter 30 are applied to a demultiplexer circuit 32 which effectively lowers the bit rate of the digital signal by demultiplexing the digital values onto a plurality of one-bit output lines which are connected to the digital RAM 34. The digital RAM 34 may be any of the conventional high-speed random access memory systems in common use at this time.

Data stored in the digital RAM 34 is reconverted to an RF signal by passing the data through the multiplexer 36, the digital-to-analog converter 38, and the mixer 40. The mixer 40, which is injected with a signal from the local oscillator 28, raises the frequency of the signal from the digital-to-analog converter 38 to the original RF frequency. More detail on this type of DRFM is contained in the two previously mentioned patents, U.S. Pat. Nos. 3,947,827 and 3,991,409.

Figure 3:
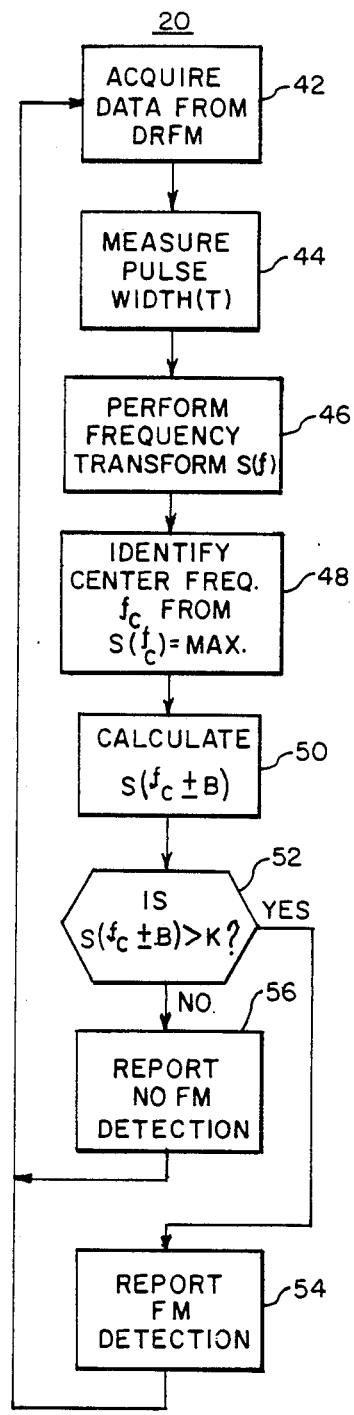
FIG. 3 is a flow chart illustrating the steps and functions performed by block 20 shown in FIG. 1.
Figure 6:
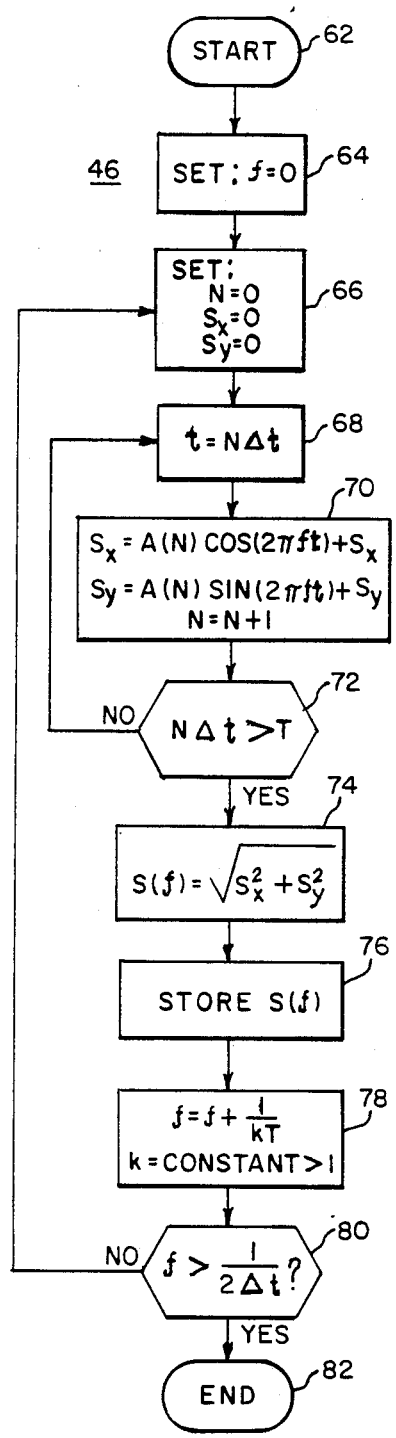
FIG. 6 is a flow chart illustrating a process for providing a frequency transform of sampled data as required by block 46 of FIG. 3.

FIG. 3 illustrates details about the phase coding and/or chirp detector 20 shown in FIG. 1. This system analyzes the data from the DRFM and indicates to the decision making portion of the jamming system whether or not the incoming radar signal was frequency modulated by phase coding or chirp modulating techniques. According to FIG. 3, the detector 20 first acquires the data from the DRFM through the data bus 24, shown in FIG. 1, as indicated in block 42. The data from the DRFM is analyzed to determine the width of the pulse of the radar signal supplying the data, according to block 44. The pulse width (T) is used to determine the range of the constant B used later in the detection process. According to block 46, the data from the DRFM 10, which is originally in a time domain form, is converted into a frequency domain form by a frequency transform process. A suitable frequency transform process for block 46 is shown in FIG. 6 and will be described more completely in connection with FIG. 6.

According to block 48, the detector 20 identifies or selects the center frequency $f_c$ by selecting the spectral line in the frequency domain having the largest amplitude. The detector 20 next calculates the spectral bandwidth of the signal as shown in blocks 50 and 52. The spectral bandwidth is normalized to the reciprocal of the pulse width determined by block 44. That is, B is defined typically by the limits $$1/T > B > 1/2T.$$

Once B is determined, the detector 20 determines whether the amplitudes of the signal at these defined bandwidth points are greater than a constant K, where K is typically defined by the limits $$1 > K > \tfrac{1}{2}.$$

Figure 5:
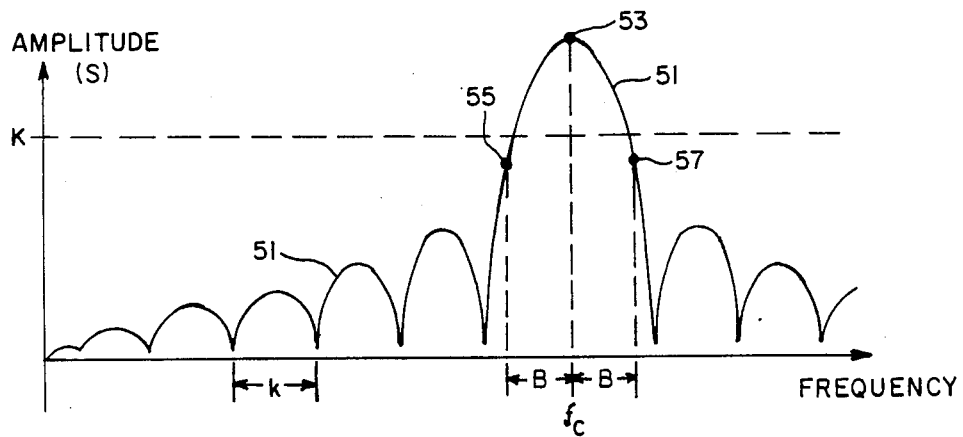
FIG. 5 is a frequency domain plot of a digitized RF signal.

A graphical representation of the functions performed by the detector system of FIG. 3 is shown by the frequency domain plot of FIG. 5. Curve 51 illustrates the relationship between the amplitude and frequency of a typical RF pulsed signal derived from an DRFM. The center frequency $f_c$ of the signal occurs at point 53 since it corresponds to the location of maximum amplitude of the signal. The spectral width $\pm B$ is indicated by the points 55 and 57. Since points 55 and 57 are less than the constant K, the signal is regarded as a pure frequency signal originated from a radar having no phase coding or chirp modulation.

Referring again to FIG. 3, block 52 makes the decision whether the bandwidth points in the frequency domain exceed the constant K. In situations where it does exceed K, such as the opposite of that illustrated in FIG. 5, the detector 20 indicates that the signal was FM modulated, according to block 54. If the spectral bandwidth points do not exceed the constant K, the detector 20 indicates that the received signal did not contain sufficient FM modulation, as indicated by block 56. The entire process loops back to the beginning to sample the next pulse from the radar.

Figure 4:
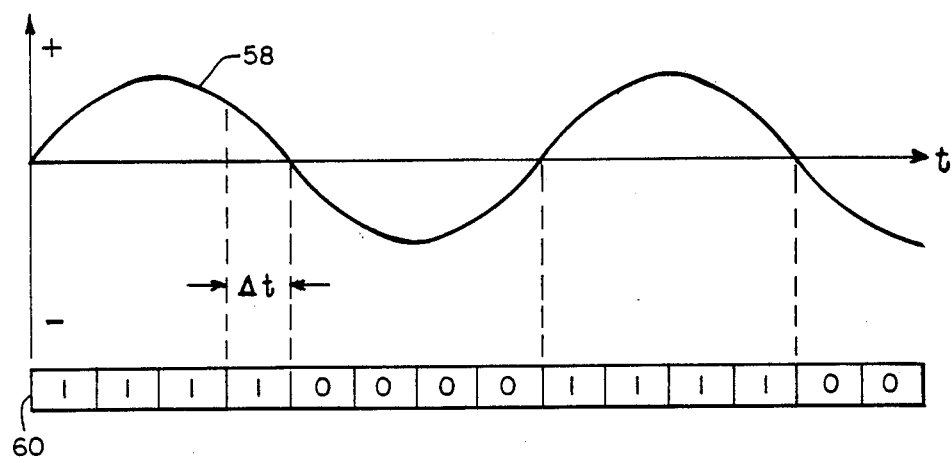
FIG. 4 is a graphical representation of one-bit decoding of an analog radar signal.

FIG. 4 illustrates the one-bit digitizing process performed by the DRFM 10 shown in FIG. 2. Curve 58 of FIG. 4 indicates the analog time-amplitude relationship of the IF signal. The logic values indicated in the block array 60 are the logic outputs of the A/D converter when signal 58 is applied thereto. Each logic value requires only one bit to represent the analog signal, with a logic one or high logic level being produced when the analog signal has a positive amplitude, and a logic zero or low logic level being produced when the analog signal has a negative amplitude. The sampling interval, $\Delta t$, determines the number of digital samples which can be acquired from the analog signal. In this specific illustration, the sampling rate is eight times greater than the frequency of the analog signal.

FIG. 6 is a flow chart illustrating a process for providing a frequency transform of sampled data as required by block 46 of FIG. 3. The process starts at block 62 and, according to blocks 64 and 66, the variables of the process are set equal to zero. For descriptive purposes, legends for some of the blocks shown in FIG. 6 are typical of computer statements or instructions which could be used in implementing the process of FIG. 6. Once the variables are set to zero by blocks 64 and 66, block 68 sets the time, t, equal to the first time differential, $\Delta t$, which is at $t=0$ initially because N is equal to zero. In block 70, A(N) represents the sample data from the DRFM, where N is the sample count, with array 60 showing fourteen such samples with a maximum N of thirteen. $S_X$ represents the real component of the frequency domain signal and $S_Y$ represents the imaginary component of the frequency domain signal. According to the instructions in block 70, the real and imaginary components are determined for the sampled data for each value of N, where the maximum N is equal to the number of time intervals contained in the radar pulse T. According to block 72, the system loops back through blocks 68 and 70 until all of the samples in the pulse have been processed, whereupon execution proceeds to block 74.

According to block 74, the amplitude of the frequency domain signal is determined by taking the square root of the sum of the squares of the real and imaginary components determined previously by block 70. These amplitude values are stored, according to block 76, in memory for the particular frequency and the frequency is then incremented by block 78. Block 80 determines whether the Nyquist limit has been reached and, if not, execution returns to block 66 to calculate the amplitude of the frequency domain signal for additional frequency increments. When the Nyquist limit has been reached, as decided by block 80, processing has been completed and execution proceeds to the end block 82.

Figure 7:
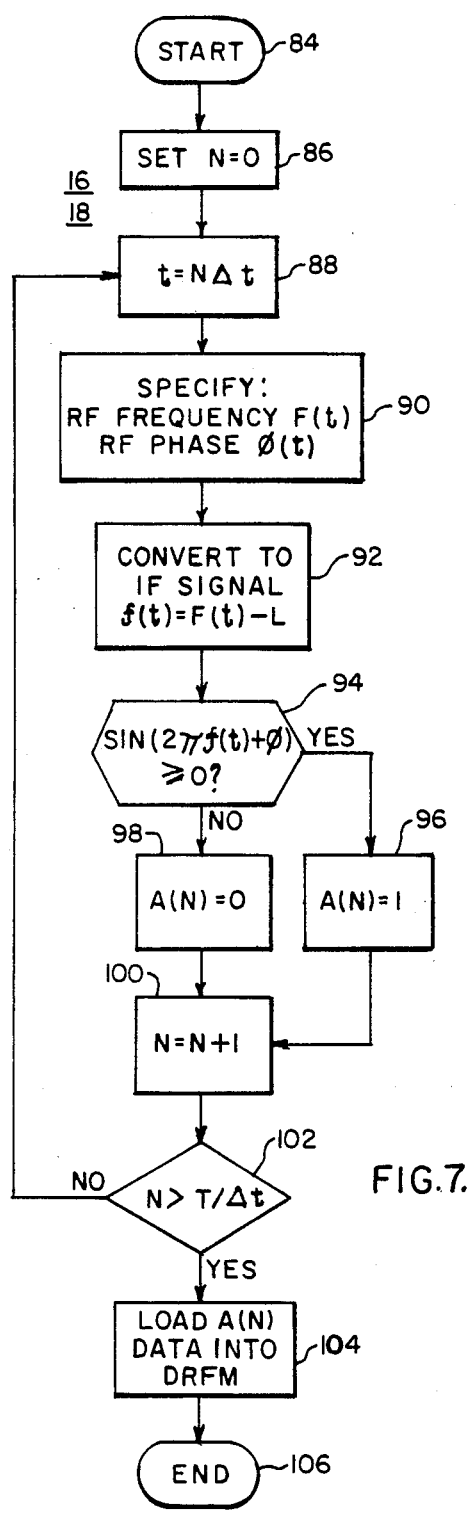
FIG. 7 is a flow chart illustrating the steps and functions performed by blocks 16 and 18 shown in FIG. 1.

FIG. 7 is a flow chart illustrating the steps and functions performed by blocks 16 and 18 shown in FIG. 1. The main difference between the use of the system shown in FIG. 7 for blocks 16 and 18 of FIG. 1 is the manner in which the frequency and phase are specified, with respect to time, in block 90 of FIG. 7. The process starts at block 84 and proceeds to block 86 which sets N equal to zero and, as shown by block 88, $t=N\Delta t$, where N is initially equal to zero. These functions primarily determine that the frequency data will be specified in relations to time at N time intervals of $\Delta t$ each. For generating a pure RF signal, as indicated by block 16 shown in FIG. 1, the RF frequency F(t) and the RF phase $\phi(t)$, as shown in block 90, are fixed with respect to time. Therefore, the quantities specified according to block 90 are constant when this process is used to generate a pure RF signal. When this process is used to generate a noise signal, either the RF frequency or the RF phase, or both, would be specified to vary according to time in block 90, since noise signals purposely do not have consistent frequency and/or phase characteristics with respect to time.

Since the data generated by the process of FIG. 7 will be loaded into the DRFM 10 of FIG. 1, which converts the frequency up to the radar frequency, the loaded data must take into consideration the frequency of the local oscillator 28 shown in FIG. 2. Consequently, according to block 92, the frequency of the loaded data f(t) is determined by subtracting the local oscillator frequency L from the desired radio frequency F(t). With the analog IF signal specified, block 94 determines the one-bit digitizing data for this signal. If the analog signal is greater than or equal to zero, the stored digital data A(N) is set equal to one by block 96. If the analog signal is less than zero, the stored digital data is set equal to zero by block 98. Both blocks 96 and 98 proceed to block 100 which increments N for the next digital sample. If all of the digital samples have been calculated, that is, if N is greater than the total number of samples $T/\Delta t$, the generation of data is completed according to block 102. The data is loaded into the DRFM, according to block 104 and the process is ended according to block 106. If all of the data samples have not been calculated according to block 102, the process loops back through the system beginning at block 88 until all of the samples have been calculated.

Figure 8:
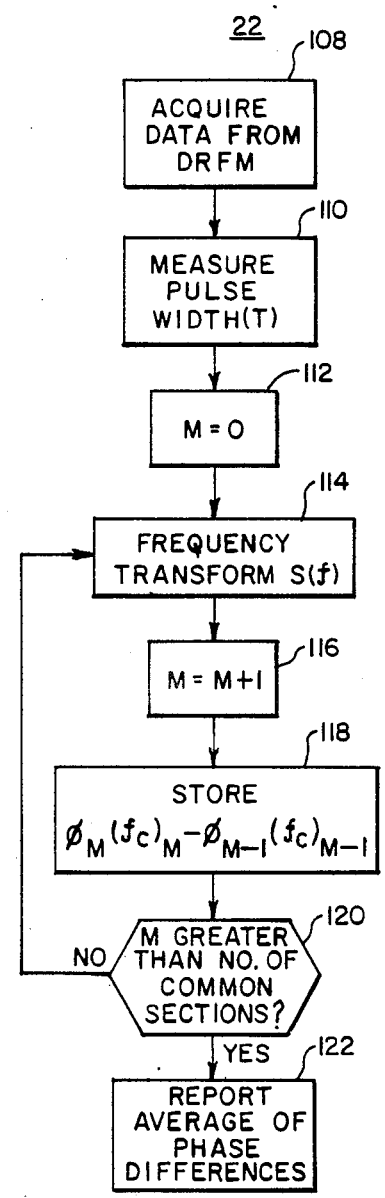
FIG. 8 is a flow chart illustrating the steps and functions performed by a portion of block 22 shown in FIG. 1.

FIG. 8 is a flow chart illustrating the steps and functions performed by the angle-of-arrival measurements function of block 22 shown in FIG. 1. The steps and functions shown in FIG. 8 are performed in connection with a jamming system in which the DRFM contains a plurality of common sections each coupled to a phased array antenna system. Each DRFM section will accurately capture the RF signal phase. By measuring the phase difference between the signals received at adjacent antenna elements, the angle-of-arrival of the signal can be determined. By a similar arrangement, the beam of the transmitting antenna can be steered by changing the phase relationship of signals stored in an DRFM having several common sections.

According to FIG. 8, the angle-of-arrival is determined by first acquiring the data from the DRFM sections, as indicated in block 108. The pulse width is measured by block 110 for use by the frequency transform process required by block 114. The number of common sections associated with different antenna elements and DRFM's is initially set to zero by block 112, where M represents the number of common sections. After the frequency transform is performed, the number of sections is incremented by block 116. According to block 118, the phase difference between the center frequencies of the frequency domain signals in adjacent DRFM sections is calculated. If all of the sections have not been used in the phase calculations, the flow loops back to block 114 to calculate data from additional sections. If, according to block 120, all of the sections have been used in the calculations, the process goes to block 122 which averages the phase differences and provides the data about the angle-of-arrival of the radar signal to the jamming system.

The invention disclosed herein provides a unique arrangement for using an DRFM to perform most of the functions required in radar jamming systems. Such an architecture makes it unnecessary to have separate subsystems or elements to perform many of the functions needed by radar jamming systems, as was required according to the prior art.

It is emphasized that numerous changes may be made in the above-described system without departing from the teachings of the invention. It is intended that all of the matter contained in the foregoing description, or shown in the accompanying drawings, shall be interpreted as illustrative rather than limiting.

I claim as my invention:

1. An electronic countermeasure active jamming system comprising:
   antenna means for receiving and transmitting high frequency electromagnetic signals;
   a digital radio frequency memory;
   first control means for enabling said memory to store binary data corresponding to the received signal;
   second control means for activating said memory to output the stored data for constructing a signal to be applied to the transmitting antenna means;
   an RF signal data generator which generates one-bit binary logic values for storage in the digital memory, with the data being at a high logic state when the RF signal to be generated is equal to or greater than a predetermined level and at a low logic state when less than said predetermined level, and wherein the generated RF signal data corresponds to an RF signal having constant frequency and phase with respect to time;
   an RF noise data generator which generates one-bit binary logic values for storage in the digital memory, with the data being at a high logic state when the RF signal to be generated is equal to or greater than a predetermined level and at a low logic state when less than said predetermined level, said values corresponding to an RF noise signal having time varying frequency and phase with respect to time; and
   a detector for detecting phase coding and chirp modulation of the received signals and for analyzing the frequency spectrum of the received signal memory data to determine if the received signal was frequency modulated.

2. The jamming system of claim 1 including at least one additional section having similar antenna, memory, storing and controlling means, and further including means for determining the angle-of-arrival of the received signal.

3. The jamming system of claim 2 wherein the means for determining the angle of arrival of the received signal further calculates the average phase difference of the center frequencies in each similar section.

* * * * *